United States Patent
Yoo et al.

(10) Patent No.: US 9,514,243 B2
(45) Date of Patent: Dec. 6, 2016

(54) INTELLIGENT CACHING FOR REQUESTS WITH QUERY STRINGS

(75) Inventors: Won Suk Yoo, Redmond, WA (US); Venkat Raman Don, Redmond, WA (US); Anil K. Ruia, Issaquah, WA (US); Ning Lin, Redmond, WA (US); Chittaranjan Pattekar, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 572 days.

(21) Appl. No.: 12/629,904

(22) Filed: Dec. 3, 2009

(65) Prior Publication Data

US 2011/0137888 A1 Jun. 9, 2011

(51) Int. Cl.
*G06F 17/30* (2006.01)
(52) U.S. Cl.
CPC .............. *G06F 17/30902* (2013.01)
(58) Field of Classification Search
CPC ................................ G06F 17/30902
See application file for complete search history.

(56) References Cited

U.S. PATENT DOCUMENTS

| | | | |
|---|---|---|---|
| 6,640,218 B1 * | 10/2003 | Golding et al. | |
| 7,035,846 B2 | 4/2006 | Gupta et al. | |
| 7,343,412 B1 | 3/2008 | Zimowski | |
| 7,509,393 B2 | 3/2009 | Agarwalla et al. | |
| 7,680,773 B1 * | 3/2010 | Acharya et al. | 707/737 |
| 2002/0178211 A1 * | 11/2002 | Singhal et al. | 709/201 |
| 2006/0053164 A1 * | 3/2006 | Ewing et al. | 707/104.1 |
| 2007/0011139 A1 * | 1/2007 | Burnett | 707/1 |
| 2008/0005273 A1 * | 1/2008 | Agarwalla et al. | 709/217 |
| 2008/0034413 A1 * | 2/2008 | He et al. | 726/9 |
| 2008/0228864 A1 * | 9/2008 | Plamondon | 709/203 |
| 2009/0063538 A1 * | 3/2009 | Chitrapura et al. | 707/102 |
| 2009/0112829 A1 | 4/2009 | Bremer et al. | |
| 2009/0164502 A1 * | 6/2009 | Dasgupta et al. | 707/102 |
| 2010/0131487 A1 * | 5/2010 | Lopez et al. | 707/709 |

(Continued)

OTHER PUBLICATIONS

Smith, et al.,"Exploiting Result Equivalence in Caching Dynamic Web Content", Retrieved at http://www.usenix.org/events/usits99/full_papers/smith/smith.pdf>> In the proceedings of the 2nd conference on USENIX Symposium on Internet Technologies and Systems, Oct. 11-14, 1999, vol. 2, pp. 13.

(Continued)

*Primary Examiner* — Mohammad S Rostami
(74) *Attorney, Agent, or Firm* — Kevin Sullivan; Micky Minhas

(57) ABSTRACT

An intelligent caching system is described herein that intelligently consolidates the name-value pairs in content requests containing query strings so that only substantially non-redundant responses are cached, thereby saving cache proxy resources. The intelligent caching system determines which name-value pairs in the query string can affect the redundancy of the content response and which name-value pairs can be ignored. The intelligent caching system organically builds the list of relevant name-value pairs by relying on a custom response header or other indication from the content server. Thus, the intelligent caching system results in fewer requests to the content server as well as fewer objects in the cache.

14 Claims, 4 Drawing Sheets

(56) References Cited

U.S. PATENT DOCUMENTS

2010/0269174 A1* 10/2010 Shelest ........................ 726/22
2010/0332491 A1* 12/2010 Cui et al. .................... 707/759
2011/0029508 A1*  2/2011 Al-Omari et al. ........... 707/718
2011/0119268 A1*  5/2011 Rajaram et al. ............. 707/737

OTHER PUBLICATIONS

John, Chamberlain, ,"Building Web Applications in Domino 6: Browser Caching and Response Header Rules", Retrieved at <<http://www.ibm.com/developerworks/lotus/library/ls-resp_head_rules/index.html>> Oct. 1, 2002, pp. 11.

Gireesh, Harikishan "Performance Improvement in asp.net using Caching with vb.net", Retrieved at <<http://www.vbdotnetheaven.com/UploadFile/hariganish/ASPNETCachingVB11152005235434PM/ASPNETCachingVB.aspx>> Feb. 1, 2005, pp. 5.

"Creating Caching Rules", Retrieved at <<http://download.oracle.com/docs/cd/B14099_19/caching.1012/b14046/ cache.htm>> Aug. 17, 2009, pp. 29.

Kumar, Apurva, "The OpenLDAP Proxy Cache", Retrieved at <<http://www.openldap.org/pub/kapurva/proxycaching.pdf>> Aug. 17, 2009, pp. 5.

* cited by examiner

INTELLIGENT CACHING FOR REQUESTS WITH QUERY STRINGS

BACKGROUND

One of the techniques for achieving high scalability for Internet content (e.g., streaming media) is using cache proxies that are distributed near the network endpoints. The operators of such network cache proxies are known as a Content Delivery Network (CDN) or Edge Cache Network (ECN) providers. A CDN is a network of tiered cache nodes that can be used to distribute content delivery. A CDN is most commonly used to reduce the network bandwidth and load on an origin server (or servers) from which the content originates, increase the response time of content delivery, and reduce latency. A CDN tries to accomplish these objectives by serving the content from a cache node that is closest to a user that has requested the content. Each caching layer serves as a "filter" by caching and serving the requested content without having to go to the origin server (such as a web server) for every request.

The Internet has built up a large infrastructure of routers and proxies that are effective at caching data for hypertext transfer protocol (HTTP). Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over strained routes, and allows the user in New Jersey to receive the content item with less latency.

When caching a content response that has resulted from a request with a query string, the cache node (or the cache proxy) does not know whether to treat the content as a unique content response or not. This is partly because the cache proxy uses the uniform resource locator (URL) as the key to store the cached content, but the query string portion of the URL may refer to dynamic content (that should not be cached), tracking information (that is irrelevant to cache), or static content (that should be cached). Consider the following requests: "http://contoso.com/myapp?a=1&b=2" and "http://contoso.com/myapp?b=2&a=1." Both are the same request and they result in the same content response. However, because of the ordering of the name-value pairs in the query string ("a" comes before "b" in the first case and "b" comes before "a" in the second case), they are treated as two different "keys" by the cache proxy. The result is that the same content is cached twice, wasting disk space and other resources of the cache proxy. Also consider the following requests: "http://contoso.com/myapp?a=1&b=2&c=3," "http://contoso.com/myapp?a=1&b=2&c=," and "http://contoso.com/myapp?a=1&b=2." Depending on how "myapp" uses the value for "c," each of these requests may result in the same response, but they will result in three separate cached objects on the cache proxy. The problem worsens when query string is used for user tracking purposes. For example, consider "http://contoso.com/myimage.jpg?sessionID=23e9834879138472304958 01-93448," where each session is assigned a different session identifier.

Some cache proxies solve this problem by ignoring the query string completely. However, this solution results in responses other than what the web content author intended. In fact, depending on which requests come in first and which of multiple cache proxies respond to the requests, users whose requests happen to go through different cache proxies can receive different responses for the same request. This is generally an unacceptable user experience.

SUMMARY

An intelligent caching system is described herein that intelligently consolidates the name-value pairs in content requests containing query strings so that only substantially non-redundant responses are cached, thereby saving cache proxy resources. The intelligent caching system is able to determine which name-value pairs in the query string can affect the redundancy of the content response and which name-value pairs can be ignored. Doing this manually involves additional workflow between the content owner and the cache proxy owner and, over time, it is possible that a misconfiguration will occur that causes incorrect cache behavior. Therefore, the intelligent caching system organically builds the list of relevant name-value pairs by relying on a custom response header or other indication from the content server. Thus, the intelligent caching system results in fewer requests to the content server as well as fewer objects in the cache.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An intelligent caching system is described herein that intelligently consolidates the name-value pairs in content requests containing query strings so that only substantially non-redundant responses are cached, thereby saving cache proxy resources. The intelligent caching system determines which name-value pairs in the query string can affect the redundancy of the content response and which name-value pairs can be ignored. Using the example above with query variables a, b, and c again, if the system determines that "c" has no impact on the returned content, then when generating the key for caching the content, "c" can safely be ignored. While it is possible to maintain a list of relevant name-value pairs manually, this creates unnecessary coordination between the content owner and the cache proxy owner. Again, using the example above, the content owner will need to notify the cache proxy owner that "c" can be ignored. Doing this manually involves additional workflow between the content owner and the cache proxy owner and, over time, it is possible that a misconfiguration will occur that causes incorrect cache behavior. Therefore, the intelligent caching system organically builds the list of relevant name-value pairs by relying on a custom response header or other indication from the content server. When such indication is received by the cache proxy, the cache proxy can build the list dynamically.

For a received request that has no cached response, the system forwards the request to a content server to retrieve the content response. The content server responds with the content response, which includes an indication of the name-value pairs in the query string that are relevant for caching. For example, the content server may include custom HTTP response header in the response that specifies the name-value pairs that are relevant for caching. The indication is typically scoped by site (e.g., based on the host header in the request), so that one cache proxy can serve multiple sites, and each site owner can provide indications for the site owner's own site. The system caches the content response under a key based on the indication of relevant name-value pairs and stores the indication to normalize subsequent requests. Upon receiving a subsequent request, the system generates a cache key using the stored indication of relevant name-value pairs for the URL. If the system finds a cached content response, then the system responds to the request from the cache, without contacting the content server again. Thus, the intelligent caching system results in fewer requests to the content server as well as fewer objects in the cache.

Figure 1:
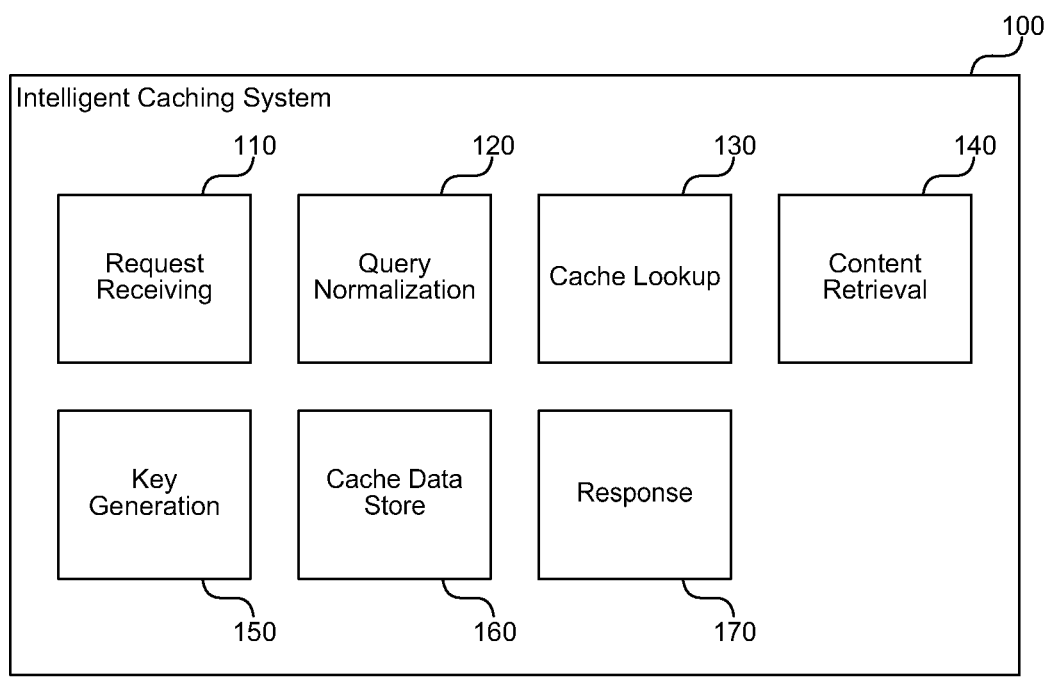
FIG. 1 is a block diagram that illustrates components of the intelligent caching system, in one embodiment.

FIG. 1 is a block diagram that illustrates components of the intelligent caching system, in one embodiment. The system 100 includes a request receiving component 110, a query normalization component 120, a cache lookup component 130, a content retrieval component 140, a key generation component 150, a cache data store 160, and a response component 170. Each of these components is described in further detail herein.

The request receiving component 110 receives requests to access content items, such as from a client or a child cache server in a hierarchy of cache proxies. Sometimes the load among cache proxies is distributed to reduce the load on any particular cache server. For example, for a given body of content, each of three cache servers in a CDN may contain one-third of the content. The cache servers may also be arranged in a hierarchy so that cache servers at one level (a child cache proxy) receive requests from clients then request data unavailable in the cache from a next cache level (a parent cache proxy), and so forth. The request receiving component 110 determines whether a requested content item is stored in the cache data store 160. Before checking the cache data store 160, the request receiving component 110 may invoke the query normalization component 120 to determine a cache key to use for looking up the requested content item in the cache data store 160. If the requested content item is available in the cache data store 160, then the request receiving component 110 typically responds by providing the cached item. If the requested content item is not in the cache, then the component 110 invokes the content retrieval component 140 to retrieve the content item from a higher-level server (e.g., an origin server or parent cache), stores the received item in the cache data store 160, and responds to the request by providing the content item. The request receiving component 110 may receive HTTP requests (e.g., GET and POST) or numerous other types of requests (e.g., file transfer protocol (FTP)) recognized by those skilled in the art.

The query normalization component 120 determines whether a received request has an associated normalization rule stored in the cache, and applies any determined rule before looking up items in the cache data store 160. For example, if a previous request has resulted in a response from a content server that indicates that certain name-value pairs are irrelevant for caching, then the system 100 may include a normalization rule for removing the irrelevant name-value pairs from the received request before looking up the requested content item in the cache data store 160. The system 100 may store a query string lookup table or other data structure in the cache data store 160 or other data store for identifying URLs or other content identifiers for which a normalization rule exists. The query normalization component 120 may normalize a URL or other identifier used in the request by rewriting the URL to remove query string name-value pairs that are not relevant to caching.

The cache lookup component 130 receives requests to identify content items stored in the cache data store 160 and looks up normalized requests for content items in the cache data store 160. For example, the component 130 may maintain an index or other bookkeeping data structure that catalogs the items available in the cache data store 160 and compare normalized requests to the index. Alternatively or additionally, cached content items may be stored in a file system as individual files, and file system query operations may be used to determine whether content items are stored in the cache.

The content retrieval component 140 retrieves, from a content server, content items not found by the cache lookup component 130 in the cache data store 160. For example, the first request for a content item or a request after an expiration time of a cached content may result in a request to a higher-level content server to retrieve the content. The content retrieval component 140 may send the request to an origin server or a higher-level parent cache proxy to retrieve the content. The content retrieval component 140 may make HTTP or other requests to retrieve content items and store the items locally in the cache data store 160. In addition to the content item, responses from the content server may include a header (e.g., "cache-honor-query-string: a,b") or other information that indicates query string name-value pairs that the system 100 can ignore for caching. The system uses this information both to invoke the key generation component 150 to cache the received content item and to add a normalization rule for subsequent received requests.

The key generation component 150 generates a key for storing a content item in the cache data store 160 that a requester will use to locate the content item. For example, the key in a cache proxy is typically the request URL (sometimes without server or host information). In the case of the intelligent caching system 100, the key generation component 150 removes any query string name-value pairs from the request URL that a content server has indicated are not relevant for caching. This combined with normalization of incoming content requests means that requests that differ only by irrelevant query name-value pairs will result in a cache hit rather than a cache miss. The increase in cache hits yields a faster response to the requesting client as well as lower burden on the content server to retrieve content items.

The cache data store 160 stores retrieved content in a data store. For example, the data store 160 may receive retrieved content from the content retrieval component 140 and store the content on a local disk associated with a cache server. The data store 160 may include a database, local or remote disk, storage area network (SAN), cloud based storage, and any other method of storing data. The cache data store 160 may store the data for a limited time or until the data is explicitly removed. Examples of limited time storage include many facilities well known in the art, such as storing data until an expiration time is passed, storing data until disk space is needed for storing new data, and so forth.

The response component 170 provides a response to received requests that includes the requested content item. The content item may have been retrieved from the cache or from a content server as described herein. The response may also include query normalization information. For example, if the content server provided an indication of the name-value pairs that are relevant for a particular URL, then the system may forward this information along in the response so that cache servers further down in the chain can use the information to implement the system 100 described herein. Each cache server in a hierarchy may employ the system 100 to reduce cache misses throughout the hierarchy.

The computing device on which the intelligent caching system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
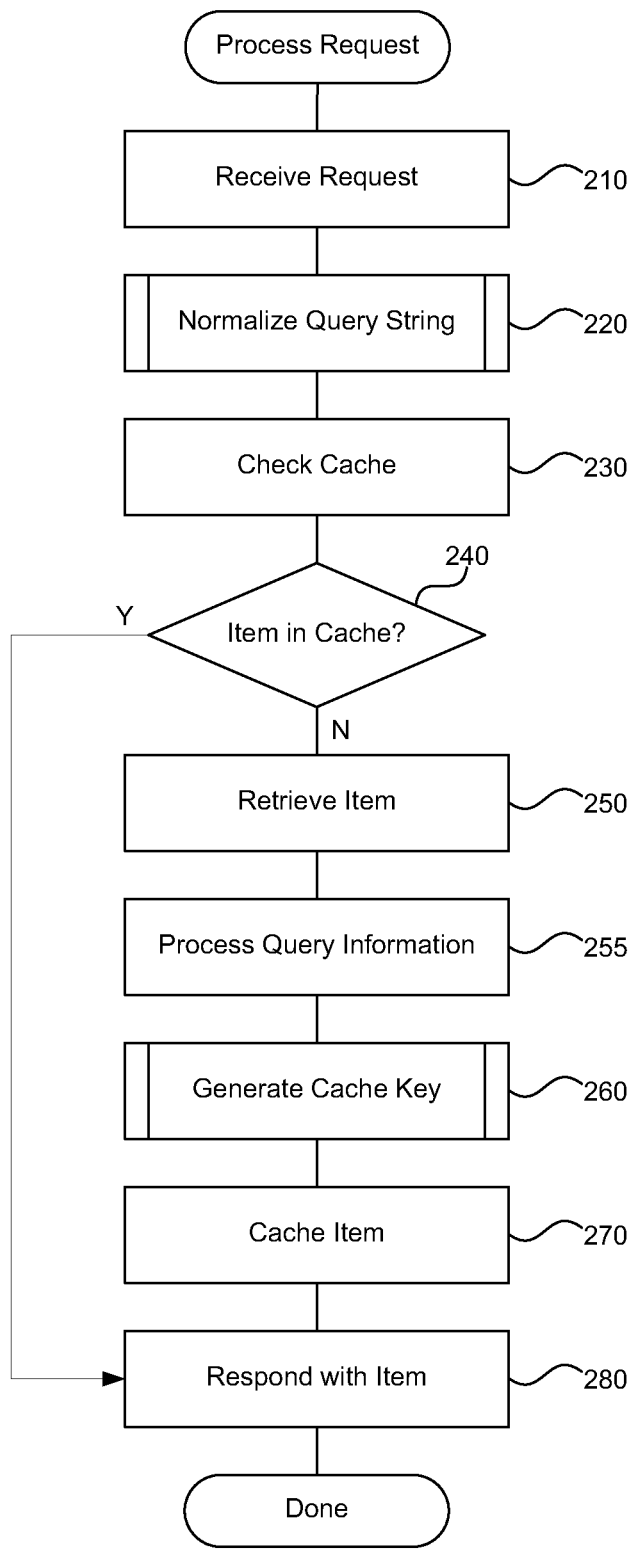
FIG. 2 is a flow diagram that illustrates processing of the intelligent caching system to process an incoming request, in one embodiment.

FIG. 2 is a flow diagram that illustrates processing of the intelligent caching system to process an incoming request, in one embodiment. Beginning in block 210, the system, operating at a cache proxy, receives a request to access a content item. For example, the request may come from a client computer attempting to playback a video stream or other content. The request may identify content in a variety of ways, such as through a URL used to access the content. The URL may include a query string understood by the client and origin server, but not necessarily by the cache proxy. A cache server that receives the request and applies the system described herein may already have cached the item requested, so that the item is available locally as described further herein.

Continuing in block 220, the system determines whether a query string exists and whether a normalization rule exists for the URL associated with the query string. For example, the system may store the part of a URL before the query string as the key in a query string lookup table to find previously received indications from an origin server about which parts of the query string are relevant for caching. As an example, for a URL "http://mysite.com/myapp?var1=abc&var2=def" the query string lookup table may include a key "http://mysite.com/myapp" that notes that "var1" is a relevant variable in the query string, but "var2" is not. Accordingly, the system may look up the URL "http://mysite.com/myapp?var1=abc" omitting the "var2" portion of the query string from the cache request.

Continuing in block 230, the system determines, using the normalized query string, whether the requested content item is available in a cache. For example, the system may access a local file system of a cache server to find a file representing the content item. Continuing in decision block 240, if the system found the item in the cache, then the system jumps to block 280, else the system continues at block 250. Continuing in block 250, the system retrieves the item by requesting the item from another server. For example, if the cache proxy executing the system is a child cache server, the system may request the content item from a parent cache server. If the cache proxy is a parent cache server, the system may request the content item from an origin server. The system receives a response from the server that contains the content item and additional query information that describes which name-value pairs of query strings associated with the content item's URL are relevant for caching.

Continuing in block 255, the system processes query information received with the retrieved item. For example, the system may access a custom HTTP header provided with the response and parse the information provided in the header to determine which query string name-value pairs are relevant for the current site. Continuing in block 260, the system generates a cache key based on the processed header with which to associate the retrieved content item, where the cache key does not contain query string name-value pairs that are not relevant for caching. For example, the system may process a response to the request to retrieve the content item to extract custom header information that provides an indication from the server of relevant name-value pairs. Alternatively or additionally, the system may receive similar information in the request received from the client. Generally, the query string has a well-understood meaning between the client and the server, and is only opaque to cache proxies and other servers in the middle. Either the client or server can provide hints about the relevance of various name-value pairs, although having the server provide this information can increase security by preventing client manipulation.

Continuing in block 270, the system stores the retrieved content item in a local cache entry associated with the generated cache key. The cache is a data store used for responding to future requests for the item without again retrieving the item from the server. Continuing in block 280, the system responds to the received request with the requested content item from the cache. For example, if the original request was an HTTP GET request, then the system provides a standard HTTP response (e.g., 200 OK) with the data of the content item. The system may also provide query string information in the response so that cache proxies that receive the response can also utilize the system. In addition, the client may use the query string information to avoid storing redundant entries in a local client cache. After block 280, these steps conclude.

Figure 3:
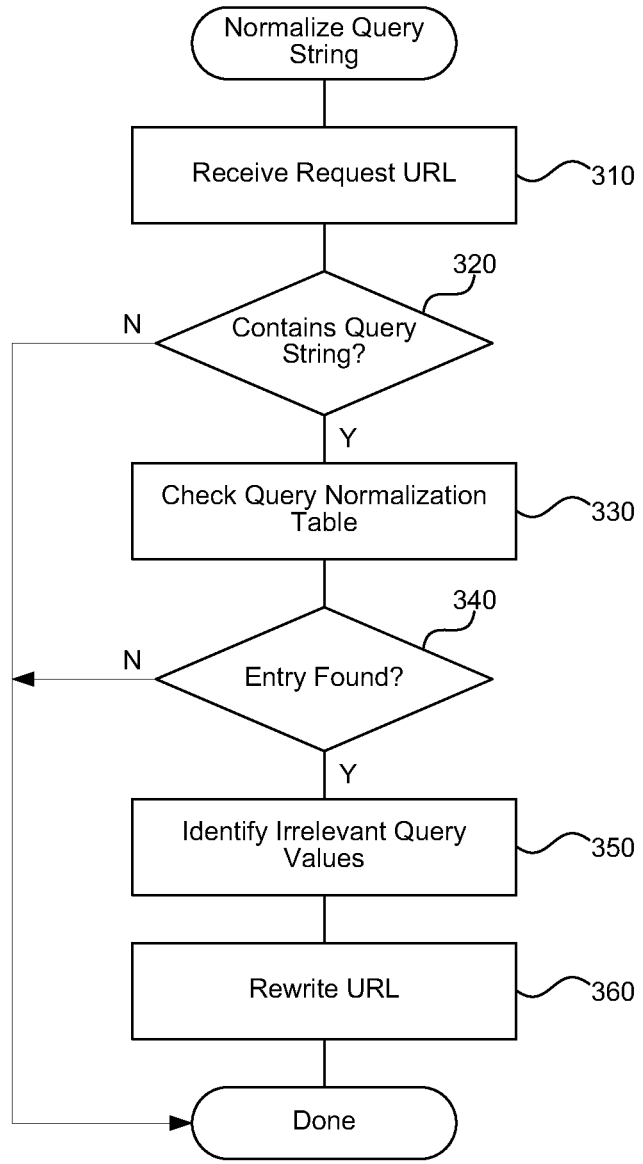
FIG. 3 is a flow diagram that illustrates processing of the query normalization component of the intelligent caching system to process an incoming request, in one embodiment.

FIG. 3 is a flow diagram that illustrates processing of the query normalization component of the intelligent caching system to process an incoming request, in one embodiment. Beginning in block 310, the component receives a content identifier associated with a content item request. For example, the request received with reference to FIG. 2 may include a URL that identifies a content item requested by a client computer system. Continuing in block 320, the component determines whether the received content identifier includes a query string. For example, the URL may end in one or more query name-value pairs that may or may not modify the content item provided by a server in response to the received request. If the received content identifier includes a query string, then the component continues at block 330, else the component completes.

Continuing in block 330, the component determines whether an entry related to the received content identifier is present in a query string normalization table. The table may include many types of data structures, such as a database table, linked list, and so forth that stores entries related to content identifiers. The table may include a column that identifies a base URL (e.g., the URL with the query string removed) to which each entry applies. Each table entry may describe query string name-value pairs that are relevant for caching. Entries can be stored as positive values (e.g., including those name-value pairs that are relevant), negative values (e.g., including those name-value pairs that are not relevant), or both. The table is built dynamically by the cache proxy by processing query information received from one or more content servers, so that an owner of a proxy does not have to manually maintain the table. In addition, a cache proxy can serve multiple sites, and the system scopes query information to a particular site so that multiple content servers can provide query information for multiple sites without interfering with one another.

Continuing in decision block 340, if the component found an entry, then the component continues at block 350, else the component completes. Continuing in block 350, the component identifies irrelevant query name-value pairs in the received content identifier, based on the determined table entry. For example, the component may process the query string iterating through each name-value pair and determine whether each pair is identified as irrelevant by the table entry. Continuing in block 360, the component rewrites the content identifier to exclude irrelevant name-value pairs in the query string. For example, the system may remove characters from the request URL that contain irrelevant name-value pairs. The system uses the rewritten URL to identify a matching content item in the cache as described further with reference to FIG. 2. The rewritten URL is used as a cache key for looking up cached content, but if the requested content item is not found in the cache and the cache server forwards the request to another server, it will provide the server with the original URL. Thus, the cache proxy does not alter the meaning of the original request, even though it is normalizing the URL for optimization. By causing a broader range of requests to map to the same cached content item, the system increases potential cache hits and reduces extra requests to an origin server for differing URLs that refer to the same content item. After block 370, these steps conclude.

Figure 4:
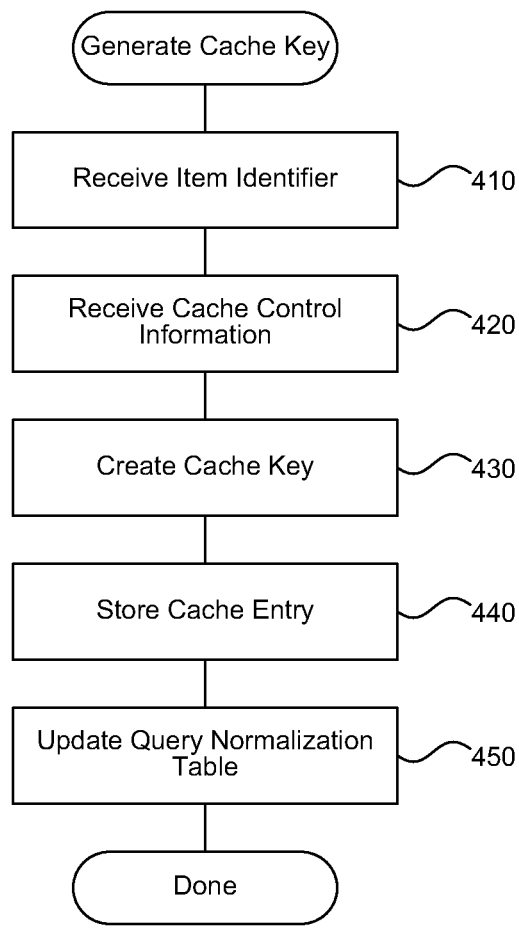
FIG. 4 is a flow diagram that illustrates processing of the key generation component of the intelligent caching system to cache a retrieved content item, in one embodiment.

FIG. 4 is a flow diagram that illustrates processing of the key generation component of the intelligent caching system to cache a retrieved content item, in one embodiment. Beginning in block 410, the component receives a content item identifier associated with the retrieved content item. For example, the component may receive a URL received by the system in a client request. The URL may contain a query string with name-value pairs. Some of the name-value pairs may not produce a different content response regardless of their value, and thus are not relevant parts of the URL for caching purposes.

Continuing in block 420, the component receives query relevance information provided by a server from which the content item was retrieved. For example, an origin server may indicate in a custom HTTP header which query names are relevant to cache. The component uses this information to exclude name-value pairs from the cache key that do not affect the content response. Continuing in block 430, the component creates a cache key based on the received content item identifier by excluding at least one portion of the identifier based on the received query relevance information. For example, if the query relevance information indicates that query values "a" and "b" are relevant for caching, the component may remove a query value "c" when creating the cache key. The system matches the cache key against a normalized incoming content identifier to determine when the cache contains a hit for a particular requested content item.

Continuing in block 440, the component stores a cache entry containing the created cache key and the retrieved content item. For example, the component may store a file in a file system or an entry in a database table that persists the contents of the cache. Continuing in block 450, the component also updates a query normalization table based on the received query relevance information so that the system can normalize subsequent requests to exclude irrelevant query string name-value pairs. By matching normalized query requests against cache keys that exclude irrelevant query values, the system increases the likelihood of a cache hit. After block 450, these steps conclude.

In some embodiments, the intelligent caching system receives query relevance information from a client in a request. Instead of receiving query relevance information from the server in a response header, the client can provide information about relevant query string name-value pairs. For example, a client requests such as "http://mysite.com/myapp?a=1&b=2&c=3&cache-honor-query-string=a,b" indicates that query names "a" and "b" are relevant for caching, but "c" is not. Although this solution is technically simpler than receiving this information from the server (i.e., because the solution avoids creating and maintaining a query string lookup table), the server approach provides enhanced security because it prevents client manipulation of system behavior. For example, a malicious client could cause a cache server to cache spurious entries by sending various query strings containing incorrect query relevance information.

In some embodiments, the intelligent caching system normalizes query string name-value pair ordering. Some clients and servers may rely on ordering of query string name-value pairs. For example, a server may treat "http://mysite.com/myapp?a=1&b=2" as different from "http://mysite.com/myapp?b=2&a=1." Although this reflects bad practice on the part of the client and server, a cache proxy typically does not modify the URL received from the client to preserve such expected behavior. However, because the URL is used as the cache key, this behavior can result in extra requests to content servers as well as extra items in the cache for clients and servers that do not care about name-value pair ordering. Thus, the intelligent caching system may receive information from the content server in the query relevance information described herein that indicates whether ordering is relevant for a particular content URL. Based on this information, the system may alphabetize or otherwise sort query string name-value pairs when normalizing the query to reduce cache objects and redundant requests to the content server.

In some embodiments, the intelligent caching system is configurable by an administrator. For example, an administrator can turn the system on or off, specify rules for which content servers the system is used on, and so forth. An administrator may determine that the cache-saving behavior of the system is not compatible with a particular content server and thus may opt to turn off the system for that content server.

In some embodiments, the intelligent caching system stores expiration information related to query relevance information. A content server may change over time so that new query values are added or old values are made more relevant. The system may periodically delete query relevance information so that the information is re-retrieved by a subsequent content request. Alternatively or additionally, the system may receive a time-to-live (TTL) or similar value from the content server indicating a duration of validity for the query relevance information. This allows the system to respond correctly to changes in the meaning of query values at the content server.

From the foregoing, it will be appreciated that specific embodiments of the intelligent caching system have been described herein for purposes of illustration, but that various modifications may be made without deviating from the spirit and scope of the invention. Accordingly, the invention is not limited except as by the appended claims.

We claim:

1. A computer-implemented method for normalizing a query string of a content request to reduce objects in a cache, the method comprising:
   receiving a content identifier associated with a content item request, wherein the content identifier includes a query string with one or more name-value pairs;
   determining whether an entry related to the received content identifier is present in a query string normalization table;
   upon identifying a matching entry in the query string normalization table,
      identifying irrelevant query name-value pairs in the received content identifier, based on the identified table entry, wherein a query name-value pair is irrelevant when removing it from the content identifier retrieves the same content item from the cache,
      rewriting the content identifier to exclude identified irrelevant name-value pairs in the query string,
      looking up the content item in the cache using the rewritten content identifier as a cache key;
      determining that the content item is not present in the cache; and
      forwarding the content item request to a second cache when the content item is determined not to be present in the cache wherein the content identifier is forwarded to the second cache in an un-rewritten format;
   wherein the preceding steps are performed by at least one processor.

2. The method of claim 1 wherein receiving the content identifier comprises receiving a uniform resource locator (URL) in a Hypertext Transfer Protocol (HTTP) request from a client received by a cache server.

3. The method of claim 1 wherein the query normalization table includes information that identifies a uniform resource locator (URL) and one or more query string name-value pairs that are relevant for caching.

4. The method of claim 1 wherein the query normalization table includes information that identifies a uniform resource locator (URL) and one or more query string name-value pairs that are not relevant for caching.

5. The method of claim 1 wherein the query normalization table includes information that identifies a uniform resource locator (URL) and whether ordering of query string name-value pairs is relevant for caching.

6. The method of claim 1 wherein determining whether an entry is present comprises matching a key in the query normalization table with the content identifier having the query string removed.

7. The method of claim 1 further comprising matching the rewritten content identifier to a content item in a cache.

8. A computer-readable storage medium comprising instructions for controlling a computer system to generate a cache key for storing a content item, wherein the instructions, when executed, cause a processor to perform actions comprising:
   receiving a content item identifier associated with a content item retrieved from a content server;
   receiving query relevance information provided by the content server that indicates one or more elements of the content item identifier that are not relevant for caching, the query relevance information including a plurality of query name value pairs, wherein a query name-value pair is irrelevant when removing it from the content item identifier retrieves the same content item from a cache;
   creating a cache key based on the received content item identifier by excluding at least one element of the content item identifier based on the received query relevance information, wherein the excluded at least one element does not affect a content response from the cache;
   determining if the created cache key is already associated with an existing cache entry;
   not storing the created cache key and the retrieved content item when the created cache key is determined to be associated with the existing cache entry; and
   storing a cache entry containing the created cache key and the retrieved content item when the created cache key is determined not to be associated with the existing cache entry.

9. The medium of claim 8 wherein receiving the content item identifier comprises receiving a uniform resource locator (URL) that contains a query string with name-value pairs.

10. The medium of claim 8 wherein receiving query relevance information comprises receiving a custom Hypertext Transfer Protocol (HTTP) response header from the content server.

11. The medium of claim 8 further comprising updating a query normalization data structure based on the received query relevance information so that the system can normalize subsequent requests to exclude request elements not relevant for caching.

12. The medium of claim 8 wherein receiving query relevance information comprises receiving an expiration indication of the query relevance information indicating a period after which the query relevance information can be discarded.

13. The method of claim 1 wherein identifying irrelevant query name-value pairs in the received content identifier further comprises:
   receiving from a requester information indicating one or more query names-value pairs are irrelevant.

14. The method of claim 1 wherein identifying irrelevant query name-value pairs in the received content identifier further comprises:
   receiving from a requestor information indicating that one or more of query name-value pairs are relevant.

\* \* \* \* \*